US00RE37567E

(19) United States
(12) Reissued Patent
Murray

(10) Patent Number: US RE37,567 E
(45) Date of Reissued Patent: Mar. 5, 2002

(54) RETRACTABLE AWNING FOR SLIDE-OUT UNIT ON MOBILE HOME, RECREATIONAL VEHICLE OR THE LIKE

(75) Inventor: Brent W. Murray, Longmont, CO (US)

(73) Assignee: Carefree/Scott Fetzer Company, Broomfield, CO (US)

(21) Appl. No.: 08/357,641

(22) Filed: Dec. 15, 1994

Related U.S. Patent Documents

Reissue of:
(64) Patent No.: 5,171,056
Issued: Dec. 15, 1992
Appl. No.: 07/810,220
Filed: Dec. 19, 1991

(51) Int. Cl.[7] ..... B60P 3/34
(52) U.S. Cl. ..... 296/163; 296/171; 296/175; 296/26.13; 135/88.12; 52/67; 160/67
(58) Field of Search ..... 296/163, 165, 296/171, 175, 172, 176, 26, 99.1, 98; 160/65, 67, 72, 81; 52/67; 135/88.12, 88.11, 903

(56) References Cited

U.S. PATENT DOCUMENTS

| | | | | | |
|---|---|---|---|---|---|
| 512,273 | A | | 1/1894 | Brown | 296/163 |
| 2,506,870 | A | | 5/1950 | Hairston | 296/175 |
| 2,574,423 | A | * | 11/1951 | Sweeney | 160/81 X |
| 2,678,687 | A | * | 5/1954 | Armstrong | 160/72 |
| 3,018,783 | A | * | 1/1962 | Tyson | 135/903 X |
| 3,263,735 | A | * | 8/1966 | Vecchiarelli et al. | 160/67 X |
| 4,160,458 | A | | 7/1979 | Marcellus | 296/160 X |
| 4,819,707 | A | * | 4/1989 | Watson et al. | 160/67 |
| 4,930,837 | A | | 6/1990 | Marsh et al. | 296/165 |
| 4,955,661 | A | * | 9/1990 | Mattice | 296/171 |
| 4,960,299 | A | * | 10/1990 | Steadman | 296/26 |
| 5,280,687 | A | * | 1/1994 | Boitgau | 296/163 X |

FOREIGN PATENT DOCUMENTS

| | | | | |
|---|---|---|---|---|
| CA | 520500 | * | 1/1956 | 160/67 |
| FR | 736446 | * | 11/1932 | 296/98 |

* cited by examiner

*Primary Examiner*—Dennis H. Pedder
(74) *Attorney, Agent, or Firm*—Dorsey & Whitney LLP

(57) ABSTRACT

A retractable awning for use on mobile homes, recreational vehicles or the like having slide-out units as a part thereof includes an awning sheet that is secured along an inner edge to the side of the mobile home with the opposite edge being secured to a torsionally biased roll bar rotatably disposed on the outer ends of support arms pivotally mounted to the outer face of the slide-out unit. A flexible tie-down strap secures the awning in an extended position with the support arms projecting substantially horizontally away from the outer wall, and upon release of the tie-down strap, the awning automatically retracts to a position immediately adjacent to the outer wall of the slide-out unit. The awning sheet always overlies the top wall of the slide-out unit when the slide-out unit is extended and regardless of whether or not the awning is extended or retracted.

9 Claims, 2 Drawing Sheets

RETRACTABLE AWNING FOR SLIDE-OUT UNIT ON MOBILE HOME, RECREATIONAL VEHICLE OR THE LIKE

Matter enclosed in heavy brackets [ ] appears in the original patent but forms no part of this reissue specification; matter printed in italics indicates the additions made by reissue.

*CROSS REFERENCE TO RELATED APPLICATIONS*

*This application is a reissue of application Ser. No. 07/810,220, filed Dec. 19, 1991, now U.S. Pat. No. 5,171,056. A continuation of this reissue application, Ser. No. 08/749,390, has been filed on Nov. 7, 1996, and is now abandoned.*

BACKGROUND OF THE INVENTION

1. Field of the Invention

The present invention relates generally to retractable awnings and more particularly to a retractable awning for use on a slide-out unit of a mobile home, recreational vehicle or the like.

2. Description of the Prior Art

Many relatively new mobile homes, recreational vehicles or the like are provided with a large rectangular opening in one side wall thereof in which a box-like enclosure commonly referred to as a "slide-out unit" is disposed for slidable movement between a retracted and extended position. When the slide-out unit is extended, it forms a perpendicular extension from the side wall of the mobile home, thereby enlarging the internal usable space. When the unit is retracted, it is drawn into the interior of the mobile home, and the unit is normally only retracted when the mobile home is transported. When the slide-out unit is retracted, an outer wall of the slide-out unit, which is parallel with the side wall in which the unit is mounted, becomes coplanar with the side wall. One problem with slide-out units has resided in the fact that debris such as leaves, blowing trash and the like will frequently collect on the top of the slide-out unit while the unit is extended, and when the unit is retracted into the interior of the mobile home, the debris is also brought into the interior.

It should also be noted that the outer wall of slide-out units frequently has a window therein, and it is sometimes desirable to provide a retractable awning for the window. While retractable awnings are available which may be used for such windows, they are limited in use to providing protection only for such window.

It is to overcome the above-noted problems inherent with slide-out units and to provide a retractable awning for a window in the slide-out unit that the present invention has been made.

SUMMARY OF THE INVENTION

The retractable awning of the present invention is adapted to be mounted on the outer wall of a slide-out unit in a mobile home, recreational vehicle or the like and is designed to not only be operatively associated with a window provided in the outer wall but to also cover the top of the slide-out unit to prevent the accumulation of debris.

The retractable awning includes an awning sheet having inner and outer edges that are parallel to each other with the inner edge being secured to the side wall of the mobile home or the like immediately above the slide-out unit. The outer edge of the awning sheet is secured to a roll bar about which the awning sheet can be wrapped. The roll bar is in turn rotatably supported at opposite ends by support arms which are pivotally mounted on the outer wall of the slide-out unit. The roll bar is torsionally biased to urge the awning into a retracted position wherein the support arms extend substantially vertically up the outer wall of the slide-out unit and wherein the roll bar itself is positioned immediately adjacent to the outer wall.

It will be appreciated from the following detailed description that even when the awning is retracted with the roll bar adjacent to the outer wall of the slide-out unit, the awning sheet still extends across the top of the slide-out unit to prevent the accumulation of debris thereon. When it is desired to extend the awning so that it provides shade over a window in the outer wall, the support arms are merely pivoted outwardly so as to extend the awning sheet at an angle away from the outer wall and in overlying relationship with the window. A tie-down strap connected to the roll bar has an opposite end that is releasably securable to the outer wall of the slide-out unit beneath the window so that the tie-down strap can counteract the bias of the roll bar to retain the awning in an extended position.

It is important to note that, whether or not the awning is extended or retracted, the awning sheet remains in overlying relationship with the top of the slide-out unit to prevent the accumulation of debris thereon. Further, due to the torsional bias on the roll bar, as the slide-out unit is retracted, the awning sheet will automatically wrap around the roll bar.

Other aspects, features and details of the present invention can be more completely understood by reference to the following detailed description of a preferred embodiment, taken in conjunction with the drawings, and from the appended claims.

DESCRIPTION OF THE PREFERRED EMBODIMENT

Figure 1:
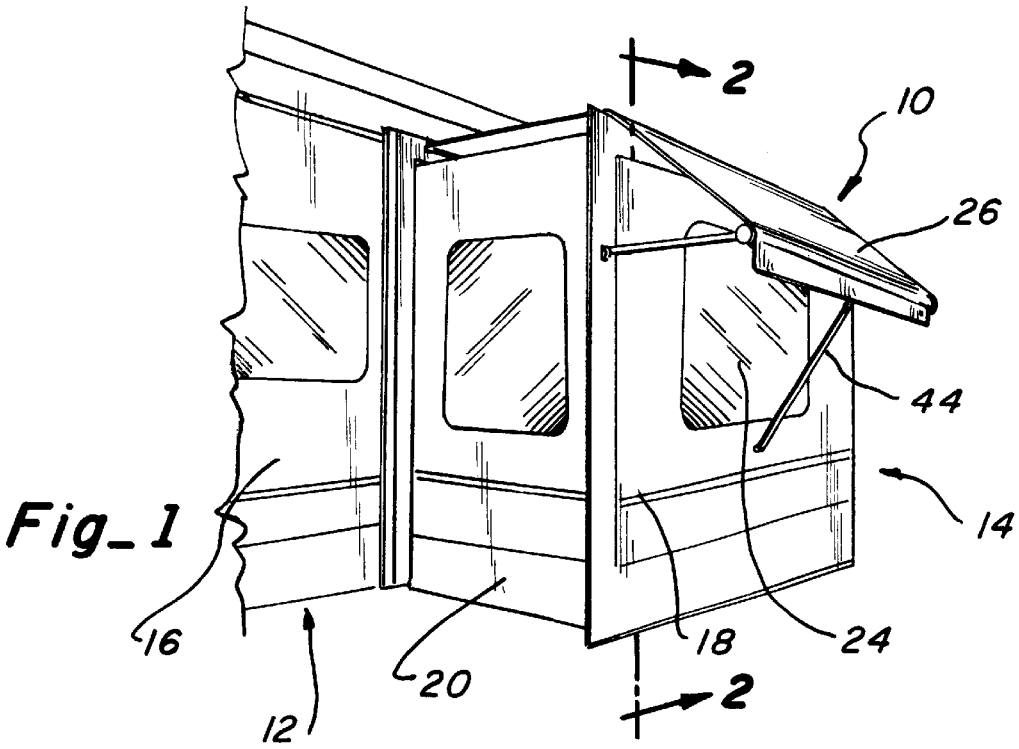
FIG. 1 is a fragmentary perspective view of a mobile home having the slide-out unit of the present invention therein and in an extended position.

With reference to FIG. 1, the retractable awning 10 of the present invention can be seen mounted on a mobile home 12 having a slide-out unit 14 as a component thereof. It will be appreciated that the retractable awning would also find use on recreational vehicles or other such structures wherein a slide-out unit of the type to be described hereinafter forms a part of the structure.

Figure 3:
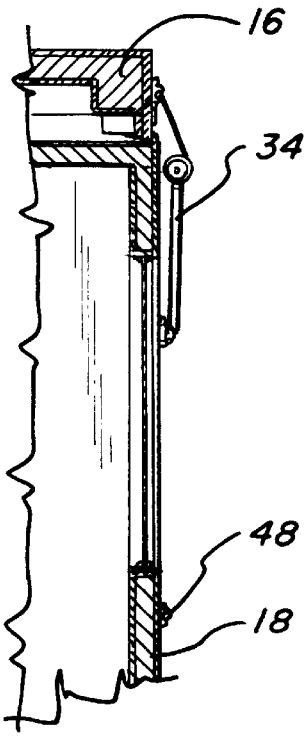
FIG. 3 is a fragmentary section similar to FIG. 2 with the awning in a retracted position and with the slide-out unit also in a retracted position relative to the mobile home.
Figure 6:
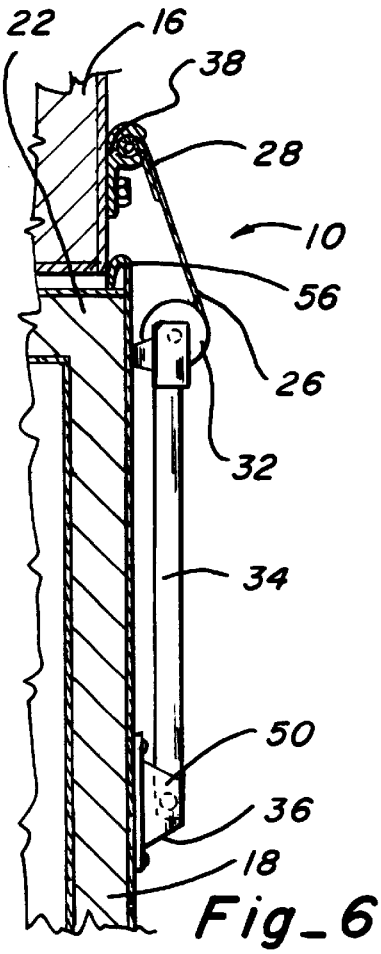
FIG. 6 is an enlarged fragmentary section similar to FIG. 3.
Figure 5:
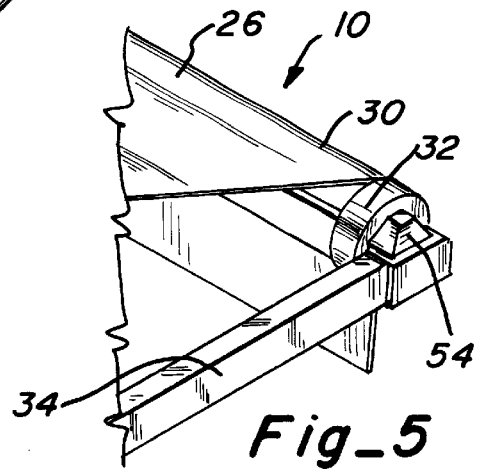
FIG. 5 is a fragmentary perspective view of the interconnection of a support arm with one end of the roll bar.

The mobile home 12 includes a vertical side wall 16 having a quadrangular opening formed therein (not seen). A five-sided box-like unit hereinafter referred to as the slide-out unit 14 is disposed in the opening and is movable between an extended position as illustrated in FIG. 1 and a retracted position as seen in FIGS. 3 and 6. In the retracted position, an outer wall 18 of the unit 14 is coplanar with the side wall 16 of the mobile home. More specifically, the slide-out unit includes the outer wall 18, two perpendicular end walls 20 (only one being seen), a top wall 22 and a bottom wall or floor which is not seen. A suitable motorized mechanism is incorporated into the mobile home to move the slide-out unit between its extended and retracted positions. The motorized mechanism is not illustrated or described as the mechanism is not relevant to the present invention.

The slide-out unit 14 has a window 24 in the outer wall 18 thereof, and it is frequently desirable to provide a sunshade or awning for the window. Inasmuch as the mobile home on which the awning 10 is mounted is movable, the awning for the window 24 must be retractable so that it can be moved into a retracted position adjacent the side of the mobile home when the mobile home is moved. As will also be appreciated, when the slide-out unit 14 is extended for any significant period of time, it is evident that debris in the form of leaves, trash or other similar material can and will accumulate on the top wall 22 of the slide-out unit. When the slide-out unit is then retracted so that the entire box-like structure is moved into the interior of the mobile home, the debris on the top wall is undesirably transported into the interior of the mobile home.

The present invention has been developed to not only provide a retractable awning for the window 24 on the outer wall 18 of the slide-out unit, but to also protect the top wall 22 of the unit from the accumulation of debris and in the process also shelters the unit from rainfall and other precipitation.

The retractable awning 10 can be seen in FIG. 1 to include a rectangular awning sheet 26 having an inner edge 28 connected to the side wall 16 of the mobile home at a location immediately above the slide-out unit 14. An opposite or outer edge 30 of the awning sheet is secured to a roll bar 32 that is bi-directionally rotatably mounted on the outer ends of a pair of support arms 34. The inner ends of the support arms are pivotally connected to spaced brackets 36 mounted on the outer wall 18 of the slide-out unit at an elevation approximately one-third of the way down the window 24. The roll bar 32 is a conventional item that is torsionally biased toward a retracted position of the awning 10. The outer edge 30 of the awning sheet is conventionally secured to the roll bar in a longitudinal groove (not seen) extending along the length of the roll bar. Such torsionally biased roll bars are common in retractable awnings of the type that are typically mounted on the sides of recreational vehicles, mobile homes and the like, and accordingly, a detailed description of the roll bar is not felt necessary.

The inner edge 28 of the awning sheet 26 is connected to the side wall 16 of the mobile home with a channel connector 38 that is secured to the side wall and extends the full width of the awning sheet. The connector 38 has a groove extending along the length thereof which is of C-shaped cross-section. A loop 40 is hemmed into the inner edge of the awning sheet so that when the loop 40 is inserted into the C-shaped groove, an elongated rod or other similar element can be inserted into the loop to retain the edge of the awning sheet in the channel connector.

A decorative valance 42 is suspended from the roll bar 32 along a longitudinal groove therein in the same manner in which the inner edge 28 of the awning sheet is attached to the channel connector 38. The same method of connection is used to connect the outer edge 30 of the awning sheet to the roll bar.

An elongated flexible tie-down strap 44 is also secured at one end to the roll bar 32 in any suitable manner and preferably at an intermediate location along the length of the roll bar. The opposite end of the tie-down strap 44 has a hook 46 secured thereto which is adapted to be releasably connected to a bracket 48 secured to the outer wall 18 at a location beneath the window 24. The strap 44 is secured to the roll bar in a manner such that it is completely free for attachment to the bracket 48 when the awning is completely extended but automatically becomes wound around the roll bar with the awning sheet as the awning is retracted.

Figure 2:
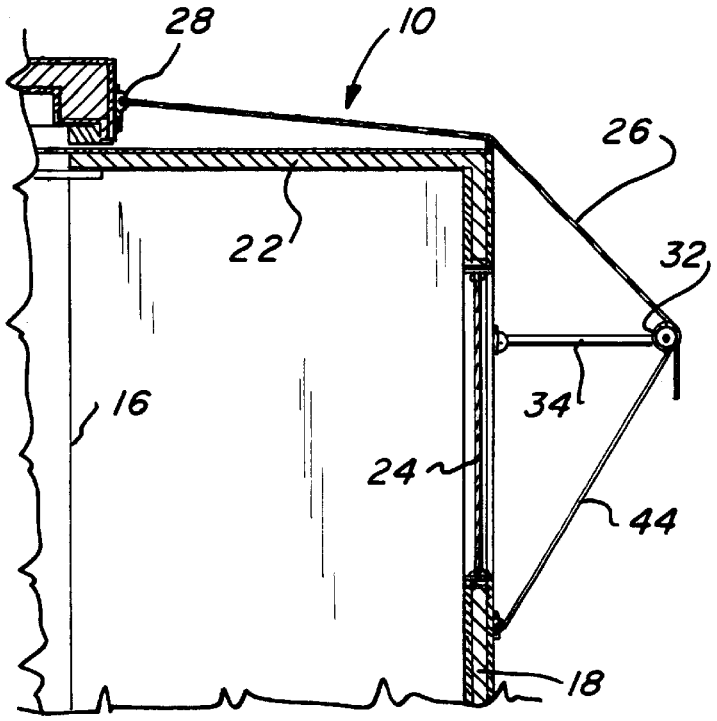
FIG. 2 is an enlarged fragmentary section taken along line 2—2 of FIG. 1 showing the awning in an extended position.

The brackets 36 to which the inner end of the support arms 34 are pivotally connected have two spaced ears 50 (only one being seen) between which the inner end of the associated support arm is positioned and pivotally supported by a cross-pin 52 that extends through each ear of the bracket. The support arms are therefore pivotable through substantially a 180 degree arc. The awning sheet 26 is dimensioned, however, so that when the slide-out unit 14 is fully extended, as shown in FIGS. 1, 2 and 4, and the awning is extended with the awning sheet fully unwrapped from the roll bar 32, the support arms project substantially horizontally away from the outer wall 18 of the slide-out unit.

Figure 4:
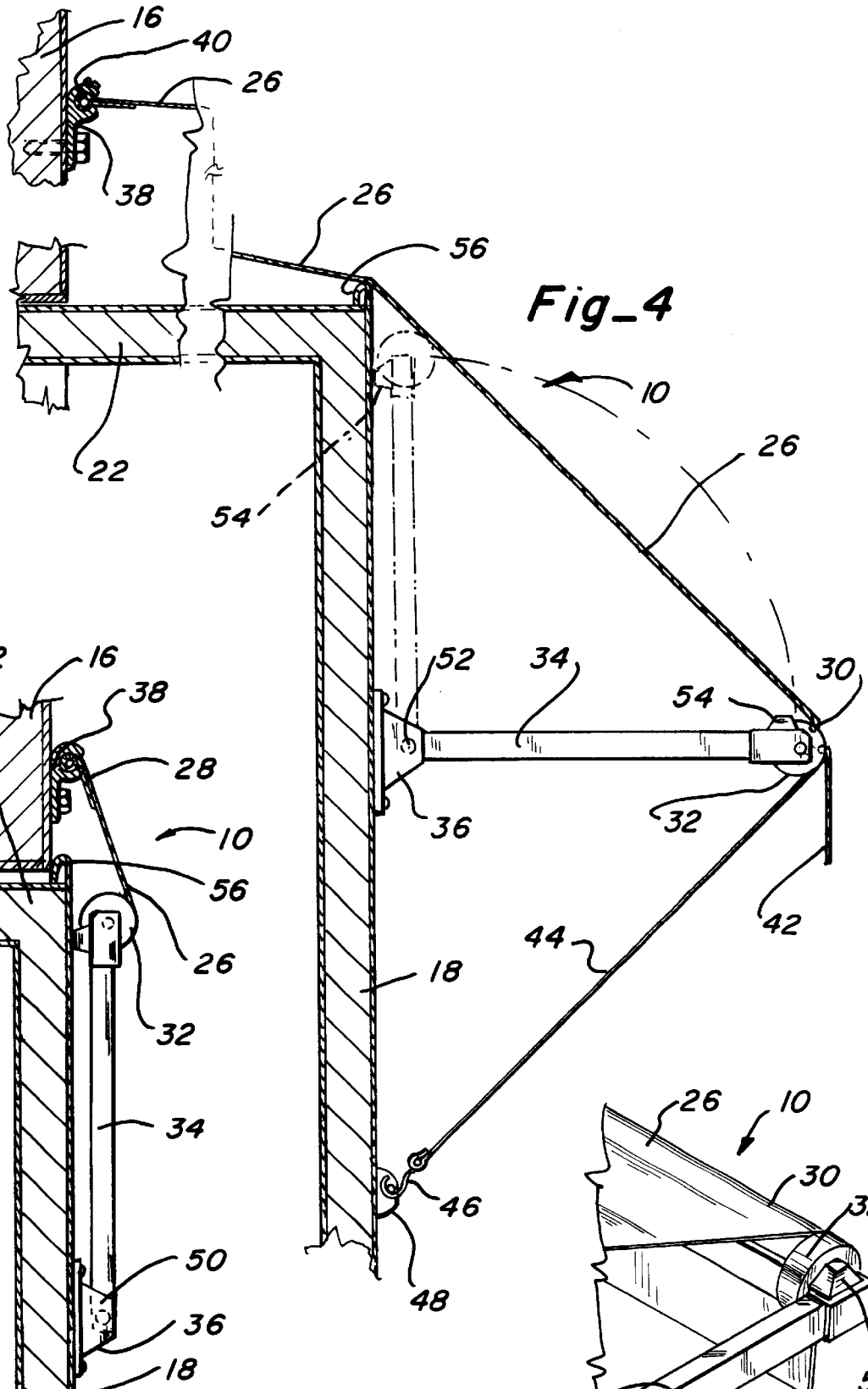
FIG. 4 is a further enlarged section similar to FIG. 2 with a phantom line representation of the awning in a retracted position.

It is important to note that the outer end of each support arm 34 has a rubber bumper or spacer 54 mounted on one side thereof so that when the support arms are moved into their upright or retracted position, the rubber spacers abut the outer wall 18 of the slide-out unit, as best seen in FIGS. 4 and 6, thereby retaining the roll bar 32 in a spaced relationship from the outer wall 18. When so spaced, if the awning is in a retracted position when the slide-out unit is moved between its extended and retracted positions, the roll bar is free to rotate, thereby allowing the awning sheet to roll off or onto the roll bar. It will also be appreciated that the awning sheet will always extend between the side wall 16 of the mobile home and the outer wall 18 of the slide-out unit and thus over any exposed part of the top wall 22 of the slide-out unit and thus cover any exposed part of the top wall 22 of the slide-out unit.

The slide-out unit 14 has a resilient rubber sealing edge 56 extending around the perimeter of the outer wall 18 so that when the slide-out unit is in its retracted position with the outer wall 18 substantially coplanar with the side wall 16 of the mobile home, the resilient edge 56 is sealingly engaged with the side wall of the mobile home. The edge 56 protrudes peripherally away from the outer wall 18 and is, therefore, raised along the top of the outer wall. The raised top of the resilient edge is useful in providing a smooth surface over which the awning sheet can slide as the slide-out unit is moved between extended and retracted positions.

It will be appreciated from the above-noted description that the retractable awning of the present invention is not only useful in providing protection to the window 24 in the outer wall 18 of the slide-out unit, but also in covering the top wall 22 of the slide-out unit to prevent the accumulation of debris. The awning is also very simple in construction and operation, since the roll bar has a built in torsional bias toward a closed position and can be easily retained in an extended position by attaching the flexible tie-down strap 44 to the outer wall 18 of the slide-out unit. It will be seen that the awning can be easily moved from its extended to retracted positions by releasing the tie-down strap and allowing the support arms 34 to pivot upwardly as the awning automatically wraps around the roll bar and the tie-down strap also simultaneously wraps around the roll bar. The awning is easily extended by pulling the support arms down, thereby allowing the tie-down strap to become unrolled from the roll bar so that it can be easily attached to the bracket 48 to retain the awning in the extended position.

Although the present invention has been described with a certain degree of particularity, it is understood that the present disclosure has been made by way of example, and changes in detail or structure may be made without departing from the spirit of the invention, as defined in the appended claims.

We claim:

1. A retractable awning for a mobile home or the like wherein said home has a side wall with an opening therein and a horizontally movable slide-out unit disposed in said opening, the slide-out unit having a vertical outer wall substantially parallel to said side wall, a *window in said outer wall, a* pair of vertical end walls substantially perpendicular to said outer wall, a horizontal bottom wall, and a horizontal top wall substantially perpendicular to said outer and end walls, said slide-out unit being selectively movable between a retracted position wherein said outer wall is substantially coplanar with said side wall and an extended position wherein said outer wall is displaced from said side wall in substantially parallel relationship therewith, said retractable awning being movable between extended and retracted positions and having an awning sheet with inner and outer edges, said inner edge being anchored to said side wall at a location above said opening and said outer edge being secured to a roll bar about which said awning sheet is rolled when the awning is retracted, a pair of support arms having an inner end pivotally mounted on said outer wall and an outer end pivotally supporting an end of said roll bar *whereby said window is shaded when the roll bar is in an extended position*, and tie down means secured to said roll bar and being releasably securable to said outer wall to retain the awning in an extended condition.

2. The retractable awning of claim 1 wherein said roll bar is torsionally biased toward a retracted position of the awning.

3. The retractable awning of claim 1 wherein said tie down means includes a flexible strap.

4. The retractable awning of claim 2 wherein said tie down means includes a flexible strap.

5. The retractable awning of claim 4 wherein said flexible strap is secured to the roll bar so as to be rollable about said roll bar with said awning sheet when the awning is moved from an extended to a retracted condition.

6. The retractable awning of claim 5 further including anchor means mounted on said outer wall beneath the mounting of said support arms to the outer wall, said flexible strap being adapted to be releasably connected to said anchor means.

7. The retractable awning of claim 2 wherein said support arms include spacer means thereon which are engageable with said outer wall when the support arms are extended substantially vertically upwardly from their mounting so as to maintain a spacing between said roll bar and the outer wall.

8. A retractable awning for a mobile home or the like wherein said home has a side wall with an opening therein and a horizontally movable slide-out unit disposed in said opening, the slide-out unit having a vertical outer wall substantially parallel to said side wall, a pair of vertical end walls substantially perpendicular to said outer wall, a horizontal bottom wall, and a horizontal top wall substantially perpendicular to said outer and end walls, said slide-out unit being selectively movable between a retracted position wherein said outer wall is substantially coplanar with said side wall and an extended position wherein said outer wall is displaced from said side wall in substantially parallel relationship therewith, said retractable awning being movable between extended and retracted positions and having a rectangular awning sheet with inner and outer edges, first anchor means mounted on said side wall above said opening for securing said inner edge of the awning sheet to the side wall, a roll bar having means thereon for securing the outer edge of said awning sheet thereto, said roll bar including torsion spring means biasing said roll bar toward the retracted position of the awning, a pair of support arms having inner and outer ends, bracket means mounted on said outer wall pivotally supporting the inner ends of said support arms, the outer ends of said support arms rotatably supporting the ends of said roll bar, said support arms being pivotally movable between a retracted position wherein the arms extend substantially vertically upwardly from their mounting and an extended position wherein they extend substantially horizontally from their mounting, said arms including spacer means thereon to retain a spacing between said outer wall and the roll bar when the support arms are in the retracted position, a flexible tie down strap having one end anchored to the roll bar and an opposite free end, and second anchor means mounted on said outer wall beneath said support arms and adapted to be releasably connected to said free end of the tie strap.

9. The retractable awning of claim 8 wherein said outer wall has an upper edge and wherein said awning sheet engages said upper edge when the slide-out unit and the retractable awning are extended.

* * * * *